United States Patent
Schaen

(10) Patent No.: US 6,464,915 B1
(45) Date of Patent: Oct. 15, 2002

(54) APPARATUS AND METHOD FOR CONTINUOUSLY FORMING TAPERED SHAKES

(76) Inventor: Randall V. Schaen, 51 Old Norwich Rd., Norwich, CT (US) 06360

(*) Notice: Subject to any disclaimer, the term of this patent is extended or adjusted under 35 U.S.C. 154(b) by 0 days.

(21) Appl. No.: 09/505,593

(22) Filed: Feb. 16, 2000

(51) Int. Cl.⁷ ................................................. B29C 47/00
(52) U.S. Cl. ...................... 264/146; 264/151; 264/157; 425/155
(58) Field of Search ................................ 264/146, 157, 264/160, 284, 151, 148, 177.1, 211; 425/142, 155; 83/42, 44, 354

(56) References Cited

U.S. PATENT DOCUMENTS

| | | | |
|---|---|---|---|
| 1,952,828 A | * | 3/1934 | Volkhardt |
| 4,193,898 A | | 3/1980 | Miller |
| 4,290,248 A | | 9/1981 | Kemerer et al. |
| 4,788,088 A | | 11/1988 | Kohl |
| 4,850,844 A | | 7/1989 | Hunting |
| 4,925,719 A | * | 5/1990 | Staneluis et al. ............. 428/71 |
| 5,088,910 A | | 2/1992 | Goforth et al. |
| 5,089,189 A | * | 2/1992 | Staneluis et al. .......... 264/45.3 |
| 5,094,058 A | | 3/1992 | Slocum |
| 5,290,355 A | | 3/1994 | Jakel |
| 5,295,339 A | | 3/1994 | Manner |
| 5,630,305 A | | 5/1997 | Hlasnicek |
| 5,635,125 A | | 6/1997 | Ternes et al. |

* cited by examiner

Primary Examiner—Mark Eashoo
(74) Attorney, Agent, or Firm—St. Onge Steward Johnston & Reens LLC

(57) ABSTRACT

An apparatus and method for forming tapered shakes with varying widths is provided. The apparatus and method include an extruder with a tapered configuration for making a tapered extrusion, a slitter for slitting the extrusion in a generally longitudinal direction, a cutter for cutting the extrusion in a generally transverse direction, and a timer for controlling operation of the cutter. The invention further provides for a continuous apparatus and method for continuously forming plastic tapered shakes that simulate traditional wooden shakes.

12 Claims, 4 Drawing Sheets

APPARATUS AND METHOD FOR CONTINUOUSLY FORMING TAPERED SHAKES

FIELD OF THE INVENTION

The invention relates to forming extruded, simulated cedar shakes. More particularly, the invention relates to continuously processing shakes that have tapered cross sections.

BACKGROUND OF THE INVENTION

Wooden shakes, or shingles, are widely known as a type of roofing material used to protect homes from rain, snow, and heat and to provide aesthetic appeal. However, wooden shakes inevitably, over time, rot, split, crack, warp, absorb water, or thermally expand. As a result, wooden shakes need to be replaced frequently in order to continue to protect the home.

Plastic shakes generally have been used to overcome the disadvantages of wooden shakes. Plastic is typically more resistant to drying and cracking than wood and, hence, lasts longer and needs less maintenance than wood. Further, plastic shakes are normally cheaper to mass-produce than cedar shakes. U.S. Pat. Nos. 5,635,125, 5,295,339, and 4,193,898 disclose various plastic shakes that were improvements over wooden shakes.

At first, plastic shingles were manufactured because they did not need to be replaced as often as wooden shakes. More recently, plastic shakes have been manufactured to go beyond the advantages that wood could ever attain. For example, the '898 patent discloses a plastic shake that is fire resistant, lightweight, and pliable in cold weather. The '339 patent discloses a plastic shake that is durable and facilitates installation. The '339 patent also discloses a shake that helps insulate the home.

Initially, plastic shakes were injected molded, a process where melted plastic would be poured into a mold and the shake would form when the plastic hardened. This process generally produced good quality shakes but was time consuming and expensive. The molds are expensive to manufacture and the process of heating and cooling the plastic under controlled conditions may require a lot of time and energy. Further, one mold typically can accommodate only one shake and, hence, the number of shakes made per unit time was limited to the number of molds available. These manufacturing expenses may have been passed onto customers and were possibly limiting factors in mass-producing plastic shakes via injection molding.

U.S. Pat. Nos. 4,290,248, 5,088,910, and 5,094,058 disclose a method of making plastic shakes in a continuous process. The process involves the plastic to be continuously extruded from a die. Upon exiting the die, the extrusion would typically be finished, or nearly finished, in two dimensions and would only require one additional cut to finish each shake. This process is advantageous because the shakes completed quickly and generally produces more shakes than injection molding.

Although this continuous process is a significant improvement in the process of making plastic shakes, this process also has limitations. For example, although plastic is continuously extruded, typically only one shake at a time can be cut off the extrusion. Meaning the number of shakes made may be limited to the same number of cuts one makes on the extrusion.

Tapered shakes are usually produced because this geometry most resembles the look and feel of traditional, wooden shakes. Further, tapered shakes are stronger than flat ones because the exposed portions of the shakes that are to withstand the elements of nature are the thicker ends of the tapered shakes. U.S. Pat. No. 4,850,844 discloses an apparatus for making tapered shakes. The '844 patent discloses that tapered shakes are produced by cutting the shakes from a block of plastic.

The disadvantage of making tapered shakes as disclosed in the '844 patent is that shakes are cut and formed one at a time and this is, on average, time consuming.

What is desired, therefore, is an improved process for continuously forming plastic tapered shakes where shakes of varying widths can be cut from the extrusion. What is also desired is an apparatus for continuously producing plastic tapered shakes where a tapered extrusion is then further slit into several tapered extrusions in order to increase the number of shakes produced. What is also desired is an apparatus for continuously producing plastic tapered shakes that allows several extrusions to be simultaneously and independently extruded, shaped, and cut.

SUMMARY OF THE INVENTION

Accordingly, it is the object of this invention to provide an improved method and apparatus for continuously forming plastic tapered shakes.

Another object is to provide a method and apparatus that simultaneously and continuously forms plastic extrusions with tapered cross sections.

Another object is to provide a method and apparatus for simultaneously cutting shakes of varying widths and quantities.

A further object is to provide a method and apparatus for storing data for cutting shakes of varying widths and quantities.

These and other objects of the invention are achieved by a method and apparatus for providing an improved process for continuously forming plastic tapered shakes where the apparatus comprises: an extruder, a slitter for slitting an extrusion in a generally longitudinal direction, and a cutter for cutting the extrusion in a generally transverse direction.

DETAILED DESCRIPTION OF THE DRAWINGS

Preferred embodiments of the invention will be described in detail with reference to FIGS. 1–5 attached hereto.

Figure 1:
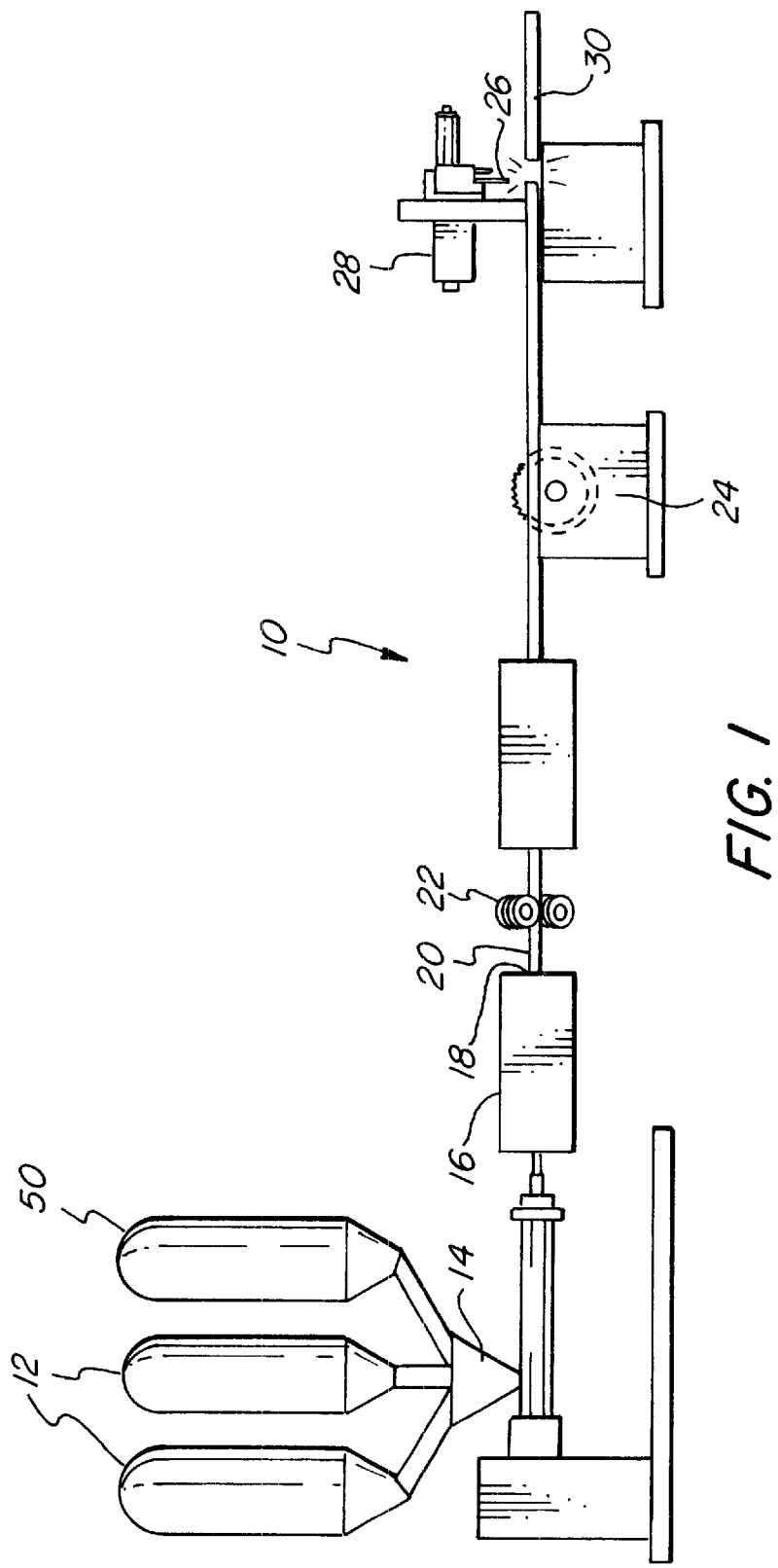
FIG. 1 illustrates the apparatus and method for forming tapered shakes with varying widths.

The embodiment shown in FIG. 1 depicts an apparatus and method for making tapered shakes of varying widths 10 comprising storage bins 12 for holding shingle materials, a mixer 14 for mixing the shingle materials, an extruder 16 for extruding the raw materials through a die 18 to form an extrusion 20 having a tapered configuration, a texturizer 22 for impressing patterns on a surface of the extrusion 20, a slitter 24 for slitting the extrusion 20 in a generally longitudinal direction, a cutter 26 for cutting the extrusion 20 in a generally transverse direction to form tapered shakes 30, and a timer 28 for controlling operation of the cutter 26. It should be noted that the apparatus and method for making tapered shakes of varying widths 10 is capable, although not necessary for proper functioning, of forming tapered shakes continuously.

In the preferred embodiment, the extruder 16 comprises a die 18 with a tapered configuration such that extrusions 20 with tapered configurations, or cross sections, are formed. This type of extrusion is preferred because it is then cut to form tapered shakes 30, the preferred cross section for it most similarly represents the appearance of traditional wooden shakes.

In order to form an extrusion 20, the raw materials need to be mixed in the mixer 14. During this mixing stage, additives 50, such as UV and fire resistant particles, can also be added into the mixer 14. The mixture of raw materials is then heated to reduce the mixture to a viscous mass. This is preferred because a viscous mass is malleable and can be plastically deformed. Care should be taken not to overheat the raw materials such that it changes to a liquid form because in this state, it cannot be properly extruded since the mixture is no longer malleable. The next step would be to force the viscous mass through the die 18 in the extruder 16. Because the die's 18 configuration is tapered, the extrusion will likewise be tapered. This tapered shape is more particularly depicted in FIG. 3.

Upon exiting the die 18, the extrusion 20 is then texturized by a texturizer 22. This results in an extrusion with surface patterns similar to the grain patterns and imperfections of traditional wooden shakes. Because the extrusion 20 is texturized subsequent to exiting the extruder 16, the extrusion 20 is, although not necessarily in a completely viscous form, still malleable and retains the impressions made by the texturizer 22.

After the extrusion 20 has cooled, a slitter 24 will slit the extrusion 20 in a generally longitudinal direction. Preferably, the slitter will slit the extrusion 20 along the center such that two smaller extrusions are formed, each with a tapered cross section. The slitter 24 is more particularly depicted in FIG. 4. The slitter 24 could be any of a number of slitting mechanisms such as, but not limited to, a band saw, chop saw, circular saw, knife, or even a simple piece of material acting as a blade and placed downstream from the extruder 16 and in the path of the extrusion 20.

Further, a cutter 26 will cut each of the extrusions 20 in a generally transverse direction. The cutter 26 will be able to cut the extrusions with a rough edge, to simulate the look of traditional wooden shakes, or smooth edge. The cutter 26 may be moveable in any direction generally perpendicular to any surface of the extrusions 20. Preferably, a timer 28 will control the cutter 26 such that cuts are made when the timer 28 sends a signal to the cutter 26. When a signal is received, the cutter 26 will move, for example, in a vertical direction down to cut the extrusion 20 and then retract to an up position until the next signal from the timer 28 is given. The cutter 26 could be any of a number of cutting mechanisms such as, but not limited to, a band saw, chop saw, circular saw, or knife.

The timer 28 may be any number of devices used to store data such as, but not limited to, a computer, programmable logic controller, or any device having a memory.

Figure 2:
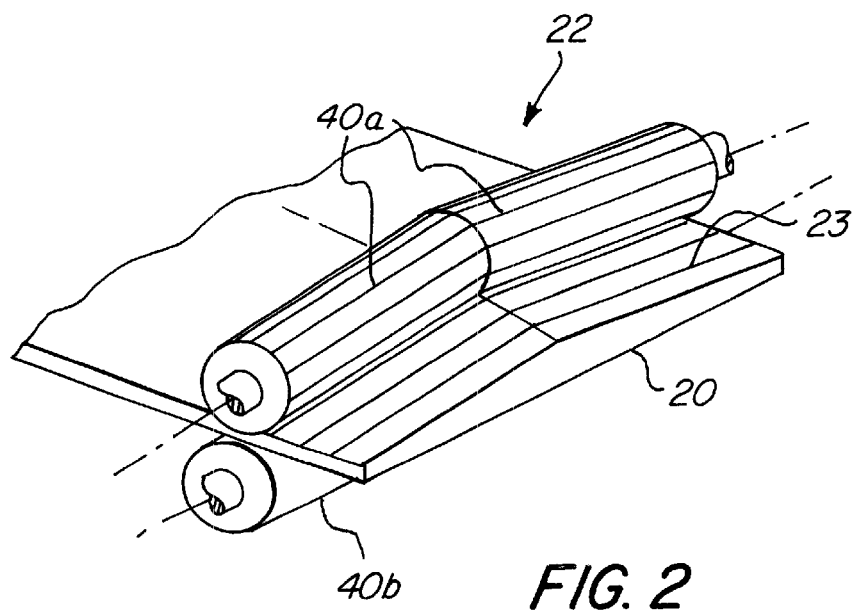
FIG. 2 is an isometric view of the texturizer impressing patterns into a surface of the extrusion.

The embodiment shown in FIG. 2 depicts a texturizer 22. The texturizer 22 may, but need not, be placed downstream from the extruder 16. The texturizer 22 will impress patterns 23 into a surface of the extrusion 20. The patterns will be to simulate those typically found on wooden shakes such as grain patterns and imperfections such as knots.

The preferred embodiment will have a set of upper rollers 40a and lower rollers 40b. The rollers 40a and 40b simultaneously impress patterns into the surface and shape both the top and bottom of the extrusion 20 as it passes between said rollers 40a and 40b. For impressing large quantities of different types of patterns in the surface, larger diameter rollers may be used for there is more rolling area upon which to put more patterns.

In the alternative, a device for impressing patterns may be separate from the rollers 40a and 40b. Another embodiment would dispense with the use of rollers 40a and 40b entirely and use other means of shaping the extrusion 20 such as a secondary die.

Figure 3:
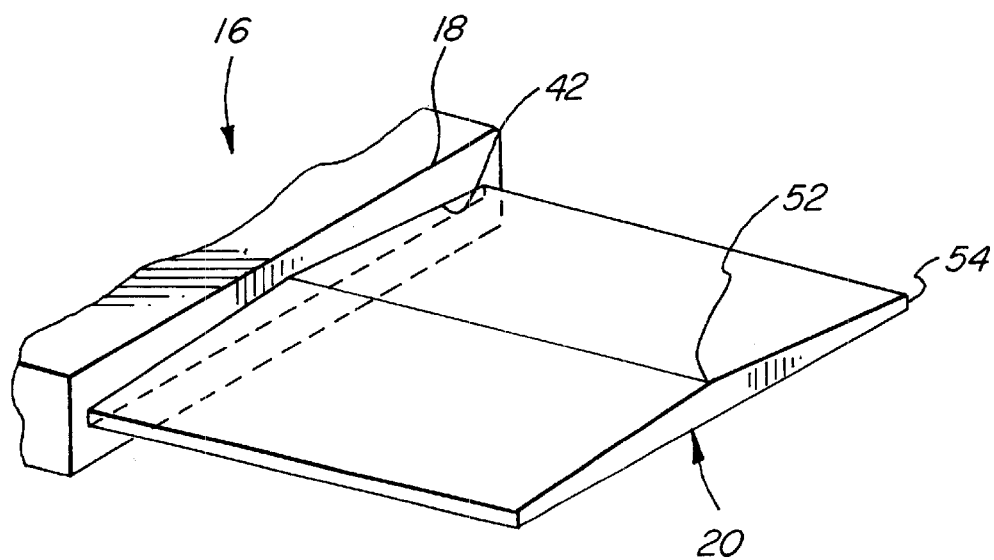
FIG. 3 is an isometric view of an extrusion with a tapered cross section exiting the die of the extruder.

The embodiment depicted in FIG. 3 shows the die 18 found in the extruder 16. The die 18 depicts an orifice 42 with a tapered configuration. This orifice 42 is through which the viscous mass flows, producing an extrusion 20 whose configuration is likewise tapered. In the preferred embodiment, the extrusion 20 will have its center 52 thicker than its edges 54 and be tapered on only one side of the extrusion 20. Upon exiting the extruder 16, the extrusion 20 is generally complete in two dimensions and needs only to be cut in order to produce finished tapered shakes 30.

Figure 6:
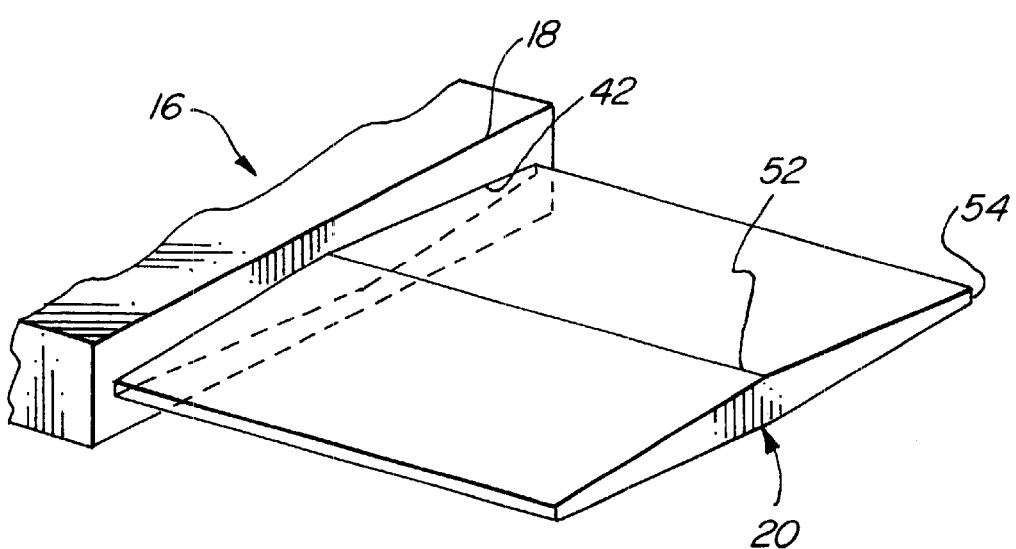
FIG. 6 is an isometric view of an extrusion that is tapered on both sides.

In an alternative embodiment depicted in FIG. 6, the extrusion 20 may be tapered on both sides. Such an embodiment would strengthen the shake 30 and create a varied appearance. To accomplish this tapered configuration, the orifice 42 would also have to be tapered on both sides.

Alternatively, the extruder would include several dies 18 and each die would have a different configuration. This would enable shakes of different cross sections and shapes to be made simultaneously. In this manner, the continuous process for making shakes would be greatly improved for the apparatus is more efficient and versatile.

Figure 4:
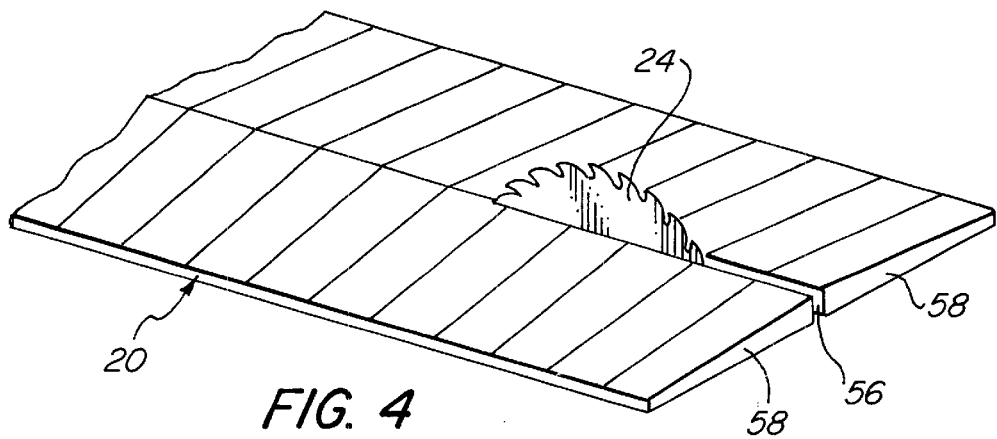
FIG. 4 is an isometric view of the slitter slitting the extrusion in a generally longitudinal direction.

The embodiment depicted in FIG. 4 shows the slitter 24 slitting the extrusion 20 in a generally longitudinal direction and, preferably, approximately up the center 56 as shown. The result is two extrusions each having a tapered cross section 58.

The slitter 24 may, but need not, be controlled by a timer 28, or memory storage device. In the preferred embodiment, the timer 28 would control the slitter 24. The timer 28 may also be programmed to store predetermined positions of the slitter 24 so that the slitter 24 could slit the tapered extrusion 20 off center to provide two extrusions of different sizes. The timer 28 could also be programmed to retract the slitter 24 so that the extrusion 20 is not slit at all. Preferably, the timer 28 is a computer. However, any device capable of storing data will suffice, such as a programmable logic controller.

Alternatively, several slitters 24 may be used to provide multiple extrusions 20 having tapered cross sections.

Figure 5:
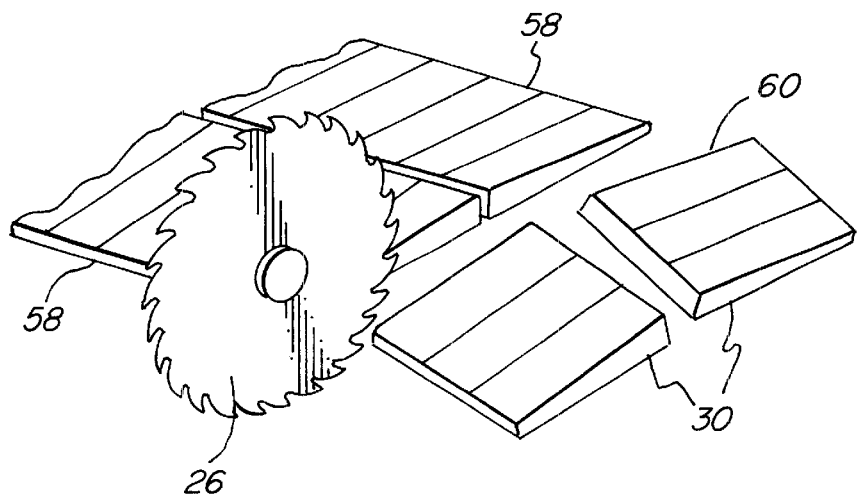
FIG. 5 is an isometric view of the cutter cutting the extrusion in a generally transverse direction.

The embodiment depicted in FIG. 5 shows the cutter 26 cutting the extrusion 20 in a generally transverse direction. The cutter 26 would be able to cut the extrusion 20 to provide tapered shakes with rough edges 60, typically the appearance of traditional wooden shakes, or with smooth edges. Further, the cutter 26 would cut the extrusion 20 in a timed manner to provide tapered shakes 30 of varying widths.

In the preferred embodiment, the tapered shakes 30 are produced continuously and, hence, the extrusion 20 is continuously extruded from the extruder 16. Therefore, by controlling the timing of the cutter 26 on a continuously extruded extrusion 20, tapered shakes 30 of varying widths may be produced. One method of controlling the cutter's 26 timing is through the use of a timer 28.

The timer 28 would be capable of storing various combinations of cutting dimensions and quantities. The timer 28 would preferably be a computer. However, any device capable of storing data would suffice, such as a programmable logic controller.

The timer 28 would control the operation of the cutter 26 by sending signals to the cutter 26 at predetermined times.

The cutter 26 would then move from the starting position above the extrusion 20 down to transversely cut the extrusion 20. The cutter 26 would then automatically retract to the starting position until another signal from the timer 28 would start the process over again. The above starting position is for exemplary purposes only. Any position would suffice whether above, below, or on the side of the extrusion 20. All that is required in the preferred embodiment is for the cutter 26 to be able to retract away from the extrusion 20 after each cut to allow a given amount of extrusion to pass before another signal from the timer 28 signals the cutter 26 to make another cut.

In the preferred embodiment, the timer 28 will store random, predetermined shake widths. The timer 28 can also store the quantity of each width to be cut and signal the cutter 26 to cut the extrusion 20 in random or fixed cycles. The cutter 26 will continue to make predetermined, timed cuts until the cycle and quantity stored in the timer 28 is complete. By having the timer 28 capable of storing numerous dimensions, widths, and cycles in its memory, this allows the user to advantageously pick and choose a cycle or width already in memory without having to reprogram the timer 28 or cutter 26 each time a different cycle or width is desired.

In another embodiment, one cutter 26 would be used for each extrusion 20 produced by the slitter 24. In this fashion, extrusions could be cut independently from one another in order to simultaneously produce different sized tapered shakes 30.

What is claimed is:

1. A method for making tapered shakes, comprising the steps of:

extruding shingle material through a die with a tapered configuration to form an extrusion having a tapered configuration;

texturing patterns on a surface of the extrusion;

slitting the extrusion in a generally longitudinal direction;

storing a plurality of combinations of cutting dimensions and quantities of shakes in a memory;

receiving a choice of a first selected combination;

retrieving information related to the first selected combination from memory;

calculating cutting signals based upon the retrieved information related to the first selected combination;

transmitting the cutting signals to the cutting tool and cutting the extrusion based upon the cutting signals;

receiving a choice of a second selected combination;

retrieving information related to the second selected combination from memory;

calculating cutting signals based upon the retrieved information related to the second selected combination;

transmitting the cutting signals to the cutting tool and cutting the extrusion based upon the cutting signals; and wherein the first selected combination is different than the second selected combination.

2. The method according to claim 1 wherein cutting the extrusion further comprises continuously cyclical cutting.

3. The method according to claim 1 wherein cutting the extrusion further comprises fixed cutting.

4. The method according to claim 1 wherein cutting the extrusion further comprises random cutting.

5. The method according to claim 1 further comprising extruding shingle material through a die with a tapered configuration to form an extrusion having a center thicker than the edges.

6. The method according to claim 1 further comprising adding additives to the extrusion.

7. The method according to claim 1, wherein said receiving, retrieving, and calculating steps are iteratively repeated.

8. A method for making tapered shakes, comprising the steps of:

extruding shingle material through a die with a tapered configuration to form an extrusion having a tapered configuration;

slitting the extrusion in a generally longitudinal direction;

generating a cutting signal at a first random interval;

transmitting the cutting signal in order to cut a first shake having a random width;

generating a cutting signal at a next random interval;

transmitting the cutting signal in order to cut a next shake having a random width; and repeating said generating and transmitting steps to provide a plurality of shakes having a plurality of random widths.

9. The method according to claim 8 further comprising extruding shingle material through a die with a tapered configuration to form an extrusion having a center thicker than the edges.

10. The method according to claim 8 further comprising slitting the extrusion through the use of a timer that imparts intervals corresponding to combinations of dimensions and quantities to a slitting tool used for said slitting the extrusion.

11. A method for making tapered shakes, comprising the steps of:

extruding shingle material through a die to form an extrusion having a tapered configuration on an upper surface and a lower surface;

slitting the extrusion in a generally longitudinal direction;

storing a plurality of combinations of cutting dimensions and quantities of shakes in a memory;

receiving a choice of a first selected combination;

retrieving information related to the first selected combination from memory;

calculating cutting signals based upon the retrieved information related to the first selected combination;

transmitting the cutting signals to the cutting tool and cutting the extrusion based upon the cutting signals;

receiving a choice of a second selected combination;

retrieving information related to the second selected combination from memory;

calculating cutting signals based upon the retrieved information related to the second selected combination;

transmitting the cutting signals to the cutting tool and cutting the extrusion based upon the cutting signals; and wherein the first selected combination is different than the second selected combination.

12. The method according to claim 11, wherein said receiving, retrieving, and calculating steps are iteratively repeated.

* * * * *